(12) United States Patent
Shah et al.

(10) Patent No.: US 11,379,460 B2
(45) Date of Patent: Jul. 5, 2022

(54) MULTIPLE APPLICATION DATA PURGE ORCHESTRATION

(71) Applicant: SAP SE, Walldorf (DE)

(72) Inventors: Hiren Shah, Bengaluru (IN); Nilesh M P, Bengaluru (IN); Shrikant Kalamdani, Bengaluru (IN)

(73) Assignee: SAP SE, Walldorf (DE)

( * ) Notice: Subject to any disclaimer, the term of this patent is extended or adjusted under 35 U.S.C. 154(b) by 8 days.

(21) Appl. No.: 17/032,507

(22) Filed: Sep. 25, 2020

(65) Prior Publication Data

US 2022/0100728 A1 Mar. 31, 2022

(51) Int. Cl.
*G06F 16/23* (2019.01)
*G06F 9/54* (2006.01)
*G06F 16/22* (2019.01)
*G06F 16/28* (2019.01)

(52) U.S. Cl.
CPC .......... *G06F 16/2358* (2019.01); *G06F 9/546* (2013.01); *G06F 16/2282* (2019.01); *G06F 16/288* (2019.01)

(58) Field of Classification Search
None
See application file for complete search history.

(56) References Cited

U.S. PATENT DOCUMENTS

| | | | |
|---|---|---|---|
| 8,355,514 B2* | 1/2013 | Rhoads | G07F 7/1016 380/252 |
| 8,535,150 B2* | 9/2013 | Kelly | G07F 17/3244 463/16 |
| 9,719,094 B2* | 8/2017 | Khvorova | C12N 15/1138 |
| 11,290,294 B2* | 3/2022 | Greven | H04L 9/0637 |
| 11,294,927 B2* | 4/2022 | Hrastnik | G06F 16/245 |
| 11,295,273 B2* | 4/2022 | Schikora | G06Q 10/103 |
| 11,301,535 B2* | 4/2022 | Haas | G06F 16/9537 |

* cited by examiner

*Primary Examiner* — Kim T Nguyen
(74) *Attorney, Agent, or Firm* — Mintz Levin Cohn Ferris Glovsky and Popeo, P.C.

(57) ABSTRACT

In some implementations, there is provided a method including validating, by an orchestrator, a deletion request by publishing a validation message to a plurality of applications including a first application and a second application, the validation message including an entity type and at least one criterion, the entity type associated with an entity structure of data entities. Related systems and articles of manufacture are also disclosed.

20 Claims, 15 Drawing Sheets

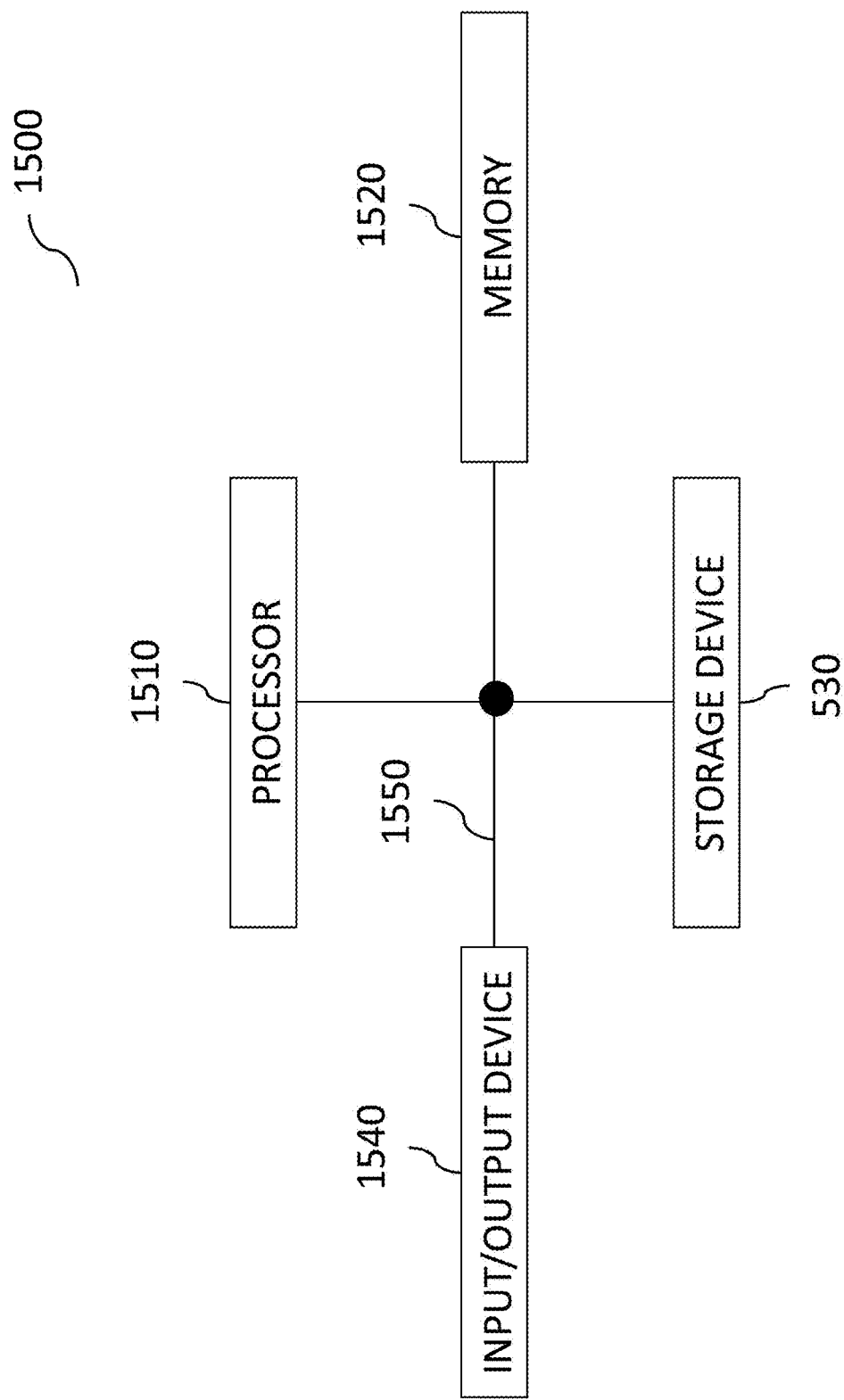

MULTIPLE APPLICATION DATA PURGE ORCHESTRATION

TECHNICAL FIELD

This disclosure relates generally to orchestrating data purges.

BACKGROUND

Many organizations may rely on enterprise software applications including, for example, enterprise resource planning (ERP) software, customer relationship management (CRM) software, and/or the like. These enterprise software applications may provide a variety of functionalities including, for example, invoicing, procurement, payroll, time and attendance management, recruiting and onboarding, learning and development, performance and compensation, workforce planning, logistics, manufacturing, inventory, and/or the like. Some enterprise software applications may be hosted by a cloud-computing platform such that the functionalities provided by the enterprise software applications may be accessed remotely by multiple end users. For example, an enterprise software application may be available as a cloud-based service including, for example, a software as a service (SaaS) and/or the like.

SUMMARY

In some implementations, there is provided a method including validating, by an orchestrator, a deletion request by publishing a validation message to a plurality of applications including a first application and a second application, the validation message including an entity type and at least one criterion, the entity type associated with an entity structure of data entities; receiving, by the orchestrator, a validation response from the first application, the validation response message including an indication that the first application is a primary owner of the entity type associated with the deletion request; publishing, by the orchestrator, a first identification message to the plurality of applications, the first identification message indicating to the plurality of applications to identify the entity structure for the entity type; in response to the first identification message, receiving, by the orchestrator, a first identification response from the first application, the first identification response including an identification completed indication at the first application for the entity structure and further including a first hint to a first dependent data entity of the entity structure that is owned by the second application; in response to receiving the first hint, publishing, by the orchestrator, a second identification message to the plurality of applications, the second identification message including the second hint; in response to the second identification message, receiving, by the orchestrator, a second identification response from the second application; in response to the second identification response indicating the second application completed identification of the entity structure without including another hint, proceeding, by the orchestrator, with a review of the entity structure and/or a deletion of the entity structure; and in response to the second identification response including another hint to another dependent data entity owned by another application, publishing, by the orchestrator, another identification message to the plurality of applications.

In some variations, one or more of the features disclosed herein including the following features can optionally be included in any feasible combination. The orchestrator may receive the deletion request from a client device. The deletion request may include the entity type being deleted and the at least one criterion for deletion of the entity type. The publishing of the another identification message is repeated until the plurality of applications accessing the entity structure each respond without including another hint to another dependent data entity at another application. The entity type may include a document type. The entity structure may include a plurality of data entities shared among at least a portion of the plurality of applications. The plurality of data entities may include data objects. The review may include publishing to the plurality of applications including the first and second applications a review file request to provide a review file including the entity structure or a location of the review file. In response to receiving from the plurality of applications one or more review files including the entity structure, the orchestrator may publish to the plurality of applications a deletion request for the entity structure. The deletion request may indicate a soft delete. The deletion request may indicate a hard delete.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 15 is another example of a system, in accordance with some implementations of the current subject matter.

DETAILED DESCRIPTION

Data objects (also referred to herein as entities or data entities) may be used by a variety of applications. For example, a requisition application may access a first set of entities, such as documents or other types of data. These first set of entities may be owned by the requisition application. However, the first set of entities may depend from (e.g., read, write to, access, etc.) data in a second set of entities owned by another application, such as a purchasing application. In this example, if the requisition application wants to delete a certain subset of the entities (e.g., all requisition documents older than 7 years), the requisition application's ability to delete this subset of entities is not straightforward given the dependency related to the second set of entities owned by the second, purchasing application. Although the requisition application may be considered the so-called "owner" of the first set of entities, the first set of entities is part of a logical group of entities that may be owned by other applications and/or stored in a variety of different locations. As such, deleting a subset of the entities may cause data inconsistencies across applications. If the requisition application deletes the subset of the entities for the older requisitions without regard for the purchasing application for example, the purchasing application may not have the data it needs to function properly. Indeed, it is not uncommon for dozens of applications (some of which may be cloud based applications) to share a logical group of entities.

Figure 1:
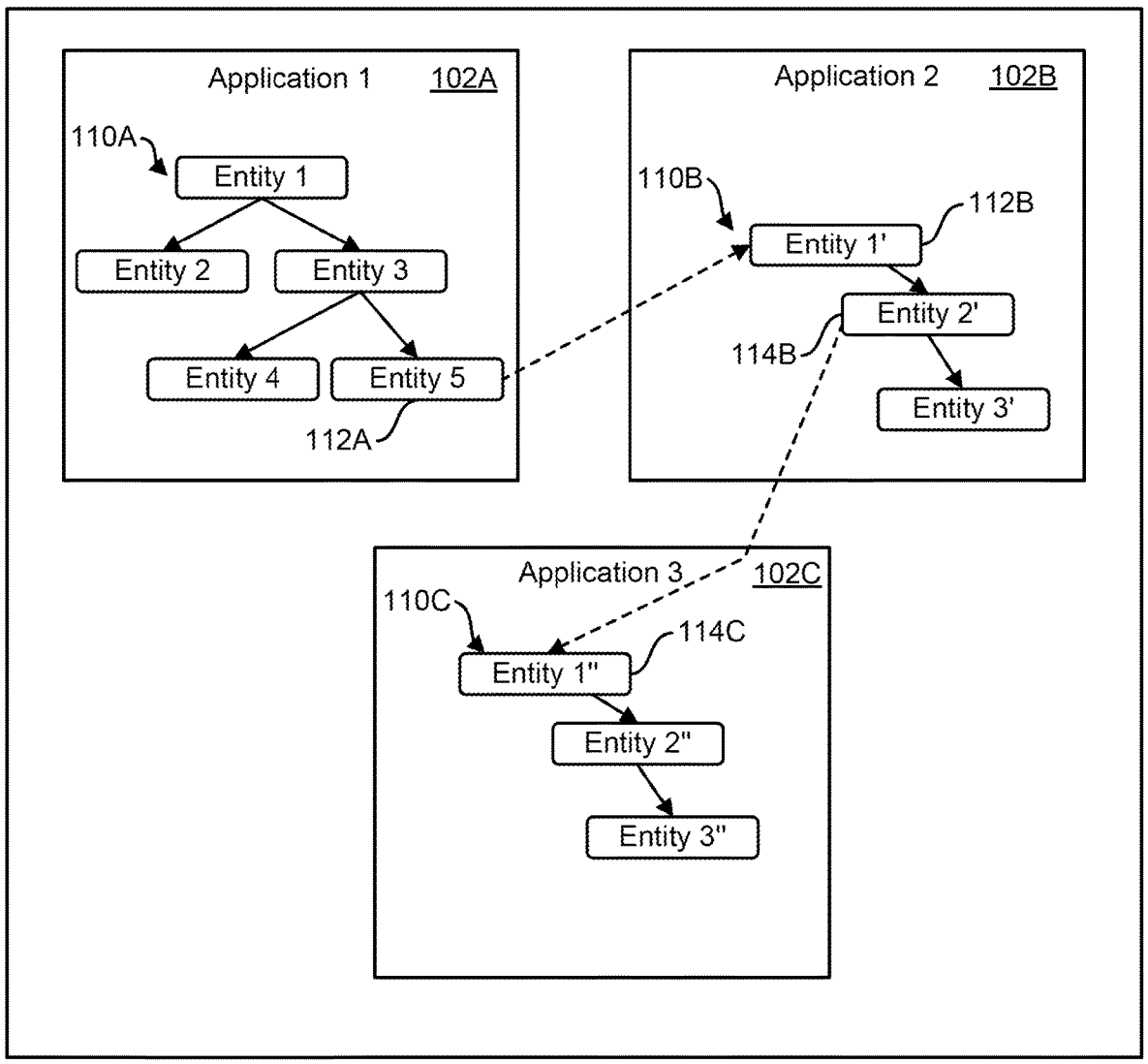
FIG. 1 depicts an example of three applications including a logical group of entities, in accordance with some implementations of the current subject matter.

FIG. 1 depicts an example of three applications 102A-C, which may be hosted on cloud-based platforms or on premises. Each application may be assigned ownership of certain entities. For example, the first application 102A may own data structure 110A including entities 1-entity 5. Ownership may refer to the first application 102A being a primary user of the entities 1-entity 5, so the first application may be primarily responsible for storage, deletion, management, and/or the like of entities 1-5. In the example of FIG. 1, the entity 5 112A depends on (e.g., is read from, writes to, is the same as, etc.) entity 1' 112B that is owned by the second application 102B). And, entity 2' 114B depends on entity 1" 114C that is owned by the third application 102C. The set of entities 110A-C may be considered a logical group. As such, if the first application wants to delete the entity 5 112A, the dependency of the entities may cause inconsistencies in the second application. As such, there is a need to take into account data dependencies when deleting data, and this deletion process may be dynamic in nature so a static deletion model may not take into account the dynamic nature of the data dependencies at the applications.

Figure 2:
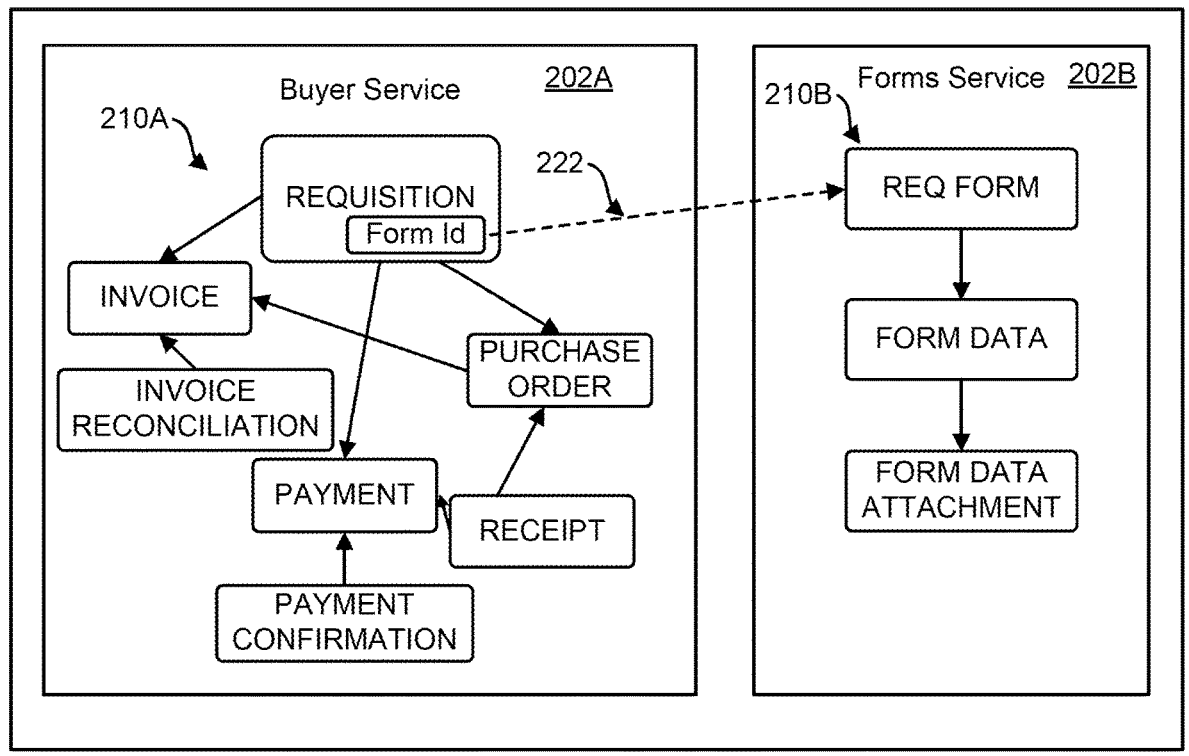
FIG. 2 depicts another example of three applications including a logical group of entities, in accordance with some implementations of the current subject matter.

FIG. 2 depicts another example of a first application 202A (which in this case is a service application) and a second application 202B (which in this case is a forms service application). In this example, the first application 202A may own the first set of entities 210A. This first set of entities is linked by a form identifier (Id) 222 to the second set of entities 210B at the second application 202B. The form ID may comprise a key, link, address, or unique identifier. Here again, the set of entities 210A-B may be considered a logical group. As such, if the first application 202A wants to perform a deletion of an entity of the first set of entities 210A, the dependency of entities at 210B may cause inconsistencies at the second application 202B.

In some embodiments, there is provided an orchestration engine to delete entities based on the logical group structure of those entities while taking into account the dependencies among the entities. The orchestration engine may be configured to delete entities based on a query criterion or criteria. In this way, a client device associated with an application may submit a request to the orchestration engine to delete one or more entities based on a query including at least one criterion, so the orchestration engine can control the deletion process for the client device. The orchestration engine may also configured to take into account that the quantity of applications involved in the deletion of entities may be dynamic (e.g., the quantity of applications can change based on the entities identified for deletion and the corresponding ownership of entities).

Figure 3:
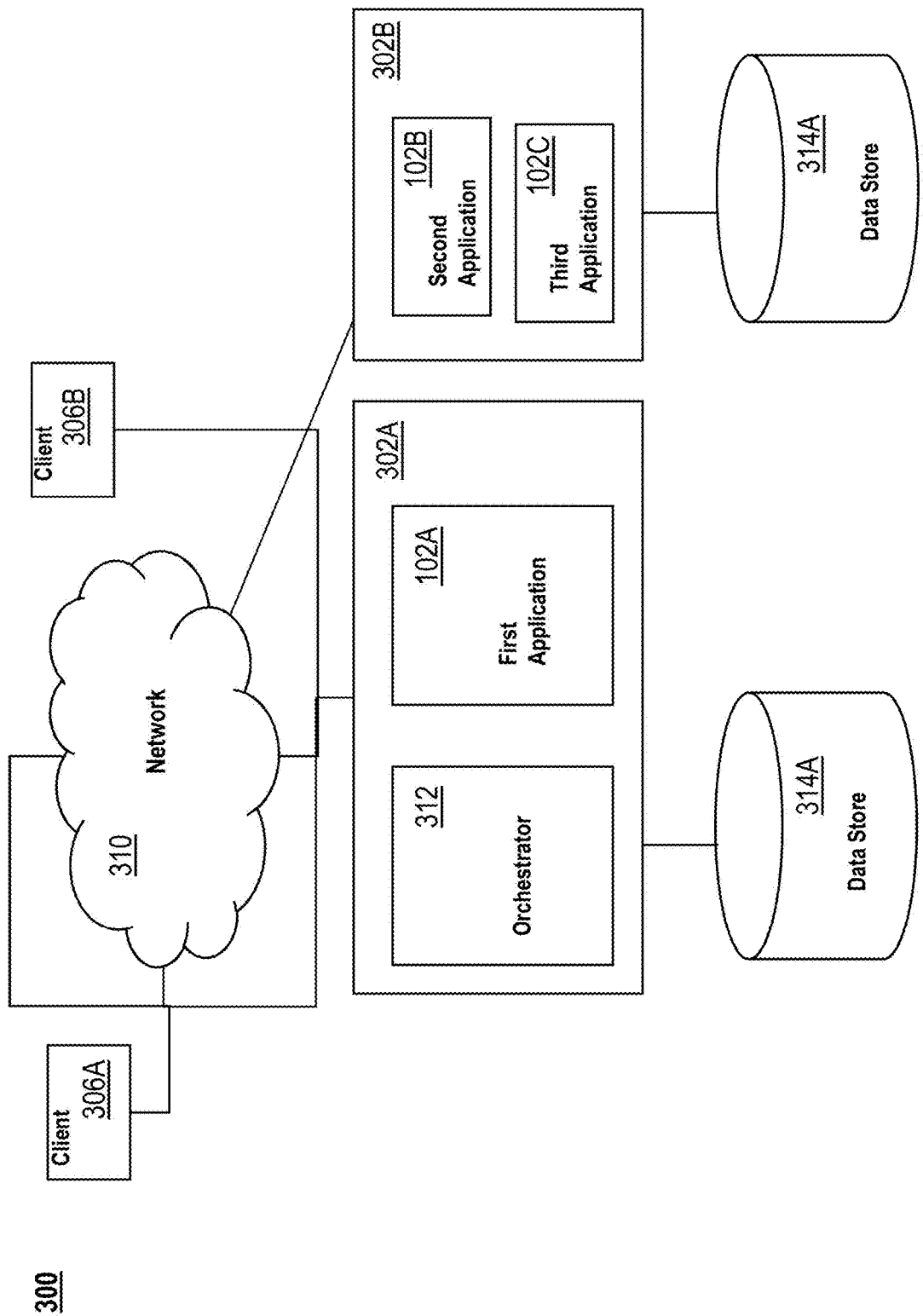
FIG. 3 illustrates an exemplary system including an orchestrator, in accordance with some implementations of the current subject matter.

FIG. 3 illustrates an exemplary system 300 including an orchestration engine 312 (also referred to herein as orchestrator), in accordance with some embodiments. The system may also include one or more client devices 306A-B coupled via a network 310 (e.g., the Internet and/or other communication network or system) to one or more backend computing systems 302A-B. For example, each of the client devices and the backend computing systems may include a processor, a memory, a storage device, and an input/output device, which may be coupled via a system bus. For example, the processor may be configured to process instructions for execution, may be a single-threaded processor, a multi-threaded processor, a graphics processor unit, and/or the like, and may be configured to process instructions stored in the memory or on the storage device, including receiving or sending information through the input/output device.

The backend computing system 302A may include the orchestrator 312 and/or at least one application, such as the first application 102A. Although FIG. 3 depicts the first application co-located with the orchestrator, in some implementations, the orchestrator is hosted on a separate machine than the first application. The backend computing system 302B may include one or more applications, such as the second and third applications 102B-C. Although FIG. 3 depicts the second and third applications as co-located, these applications may be hosted in separate machines as well. In some implementations, the orchestrator 312 and/or the applications 102A-C are implemented as Software as a Service (SaaS), and the orchestrator 312 and/or applications 102A-C may be hosted in a backend computing system provided by a cloud service platform, although the orchestrator may be hosted on premises as well. As noted, the applications 102A-C may share at least a portion of a logical group of entities 110A-C. These entities may be stored in one or more persistent storage devices, such as database management systems 314A-B. Although FIG. 3 shows two database management systems, the system may access other quantities of database management systems as well. Although some of the examples refer to clients and servers, other types of architectures may be implemented as well, such as peer-to-peer and/or distributed. Moreover, the orchestrator 312 may operate based on a publish and subscribe model with respect to the downstream applications 102A-C.

In some implementations, each of the applications 110A-C may register with the orchestrator 312 to participate in the deletion service provided by the orchestrator. For example, a client device 306A may be accessing (via a user interface at the client device) the first application 102A and may submit to the orchestrator 312 a deletion request. The deletion request may be in the form of a query including a type of entity (e.g., an entity type) and at least one criterion. For example, the query may include an entity type of "requisition documents" and the at least one criterion of "created on or before Aug. 1, 2006." When the orchestrator 312 receives a deletion request, the orchestrator may create a job request to track the workflow progress of the client's deletion request.

Figure 4:
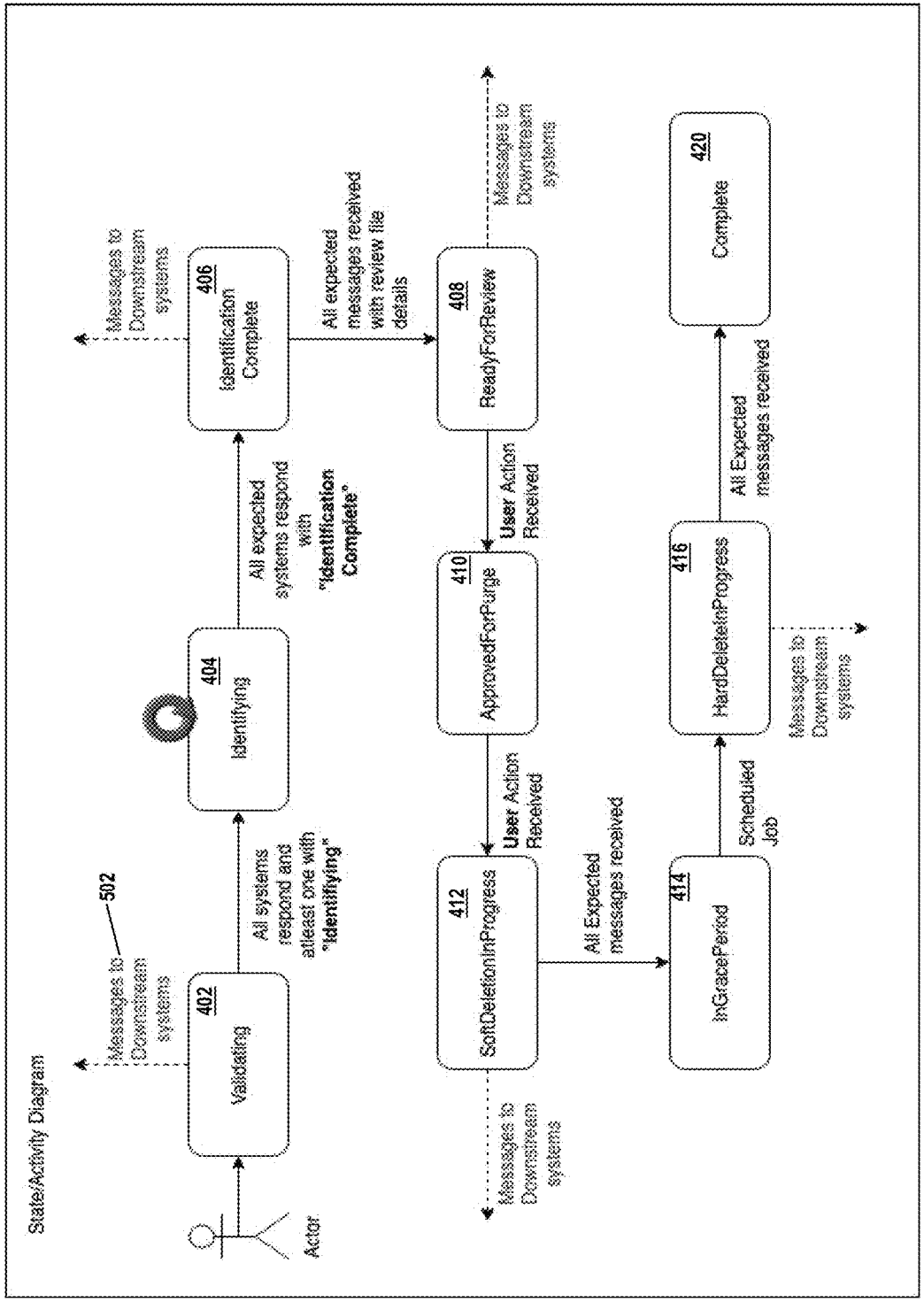
FIG. 4 depicts an example of an orchestrator process for deleting entities, in accordance with some implementations of the current subject matter.

FIG. 4 depicts an example of a process 400 for deleting entities, in accordance with some example embodiments.

At 402, the orchestrator 312 may validate a query for the deletion of one or more entities. In response to the query requesting a deletion from the client device 306A/first application 102A, the orchestrator may, at 402, publish one or more messages to the applications 102A-C. The published message may include an identifier (e.g., a job request ID or some other type of identifier to track the workflow for the query request for the deletion), an indication of the document type, and at least one criterion.

Figure 5:
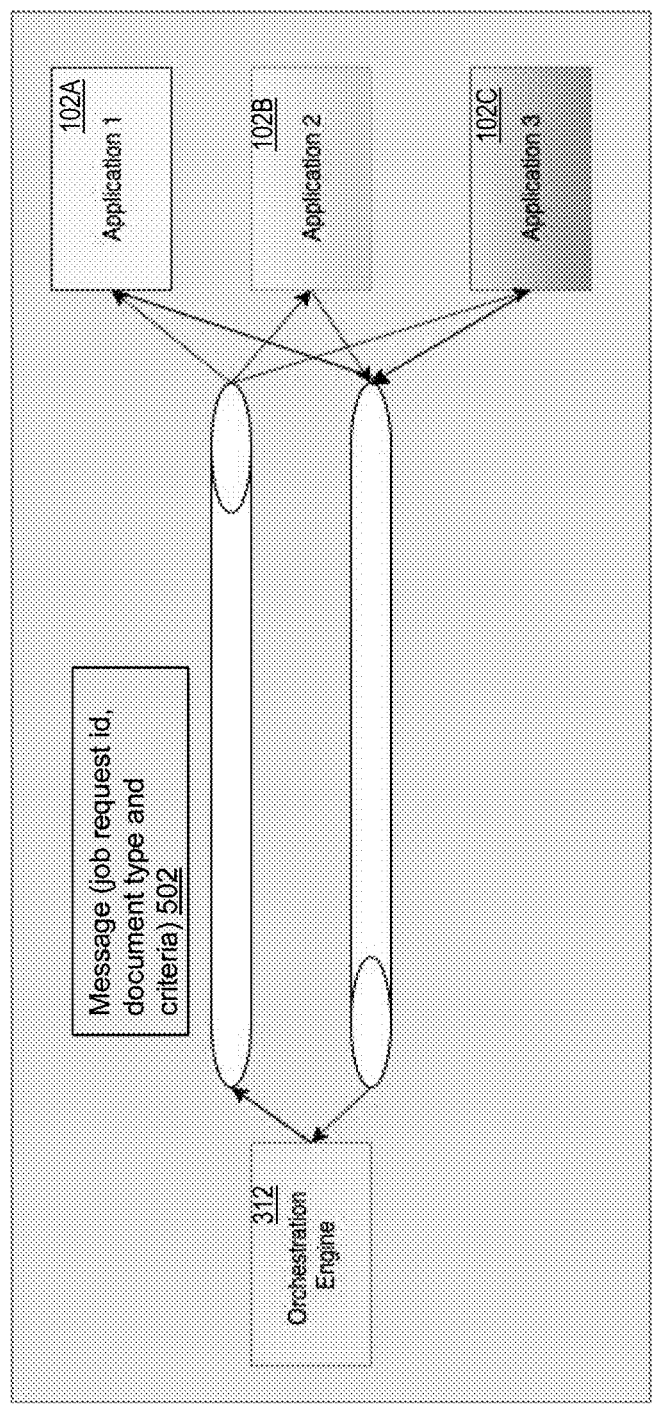
FIGS. 5-13 depict examples of messages and responses associated with the orchestrator process for deleting entities, in accordance with some implementations of the current subject matter.

FIG. 5 depicts an example of a published message 502 being sent to the applications 102A-C. For example, the message 502 may indicate "requisition document" entities created on or before Aug. 1, 2006. If a downstream application 102A-C understands (e.g., has entities that can be queried), the downstream application responds to the orchestrator 312 with an acknowledgment (which may include at least the identifier such as the job request ID), the indication of the document type (e.g., requisition document), and/or the at least one criterion). For example, one or more of the applications 102A-C may understand and acknowledge the message 502. If none of the applications 102A-C understands the message 502 or its criterion however, the deletion job may transition to a "finished" state and the orchestrator may respond to the client device or application (which originated the request) with an indication that deletion request cannot be completed, for example. In some embodiments, only the owner of the document type found in message 502 may respond and indicate that it is the primary owner of the document type indicated by message 502. For example, the first application 102A may respond to the orchestrator 312 by sending a response to message 502 indicating the first application 102A is the owner of requisition documents.

Figure 6:
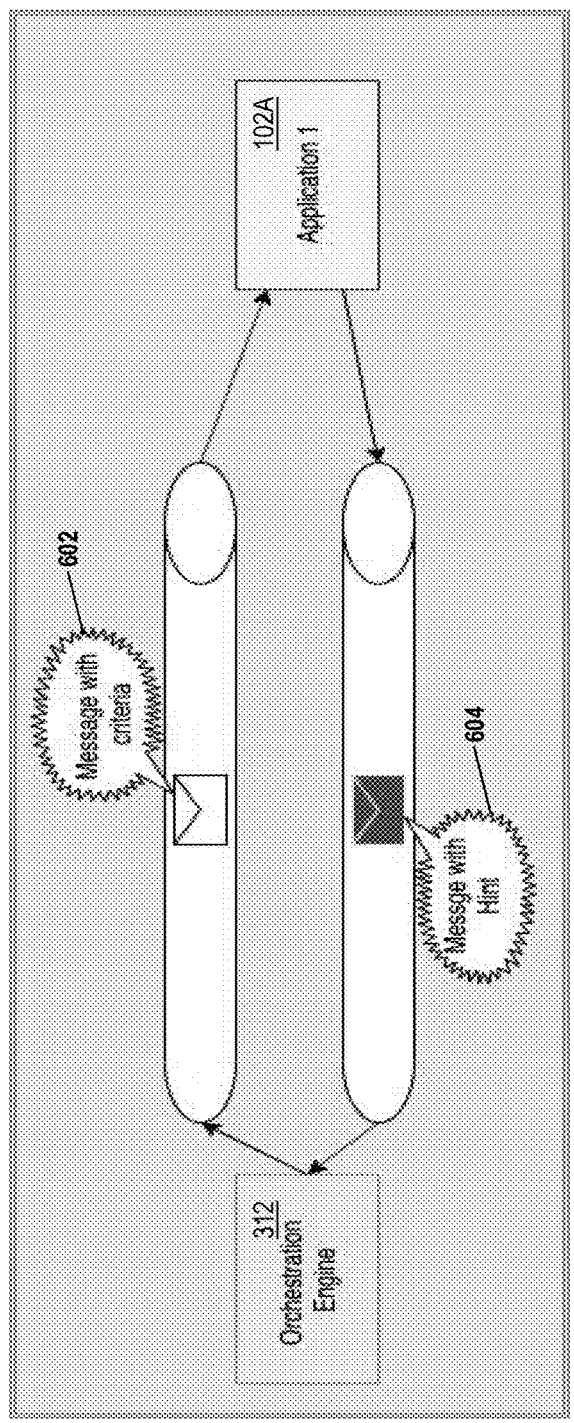

Referring again to FIG. 4, the orchestrator 312 may send, at 404, send a message, such as message 602 depicted at FIG. 6, to the first application 102A. Referring to FIG. 6, the message 602 may include an identifier (e.g., the job request ID) and a request to identify for possible deletion requisition document entities created on or before Aug. 7, 2006. In this example, the first application 102A is an owner of the entity (or document) type identified in the message 602. When the first application 102A receives the message 602, it identifies, based on the document type and criterion, the structure of any related entities. During the identification stage, the first application identifies the entities 110A and any dependent entities, such as entity 112A which depends on entity 112B owned by another application 102B. The first application may persist the identified structure 110A and the dependency on the entity 112B, and the first application may respond to the orchestrator with a message 604 including (1) the identifier (e.g., the job request ID), (2) an indication that the identification is completed, and (3) an indication that the first application is not the owner of entity 112B but rather the second application 102B is the owner of the entity 112B.

Figure 7:
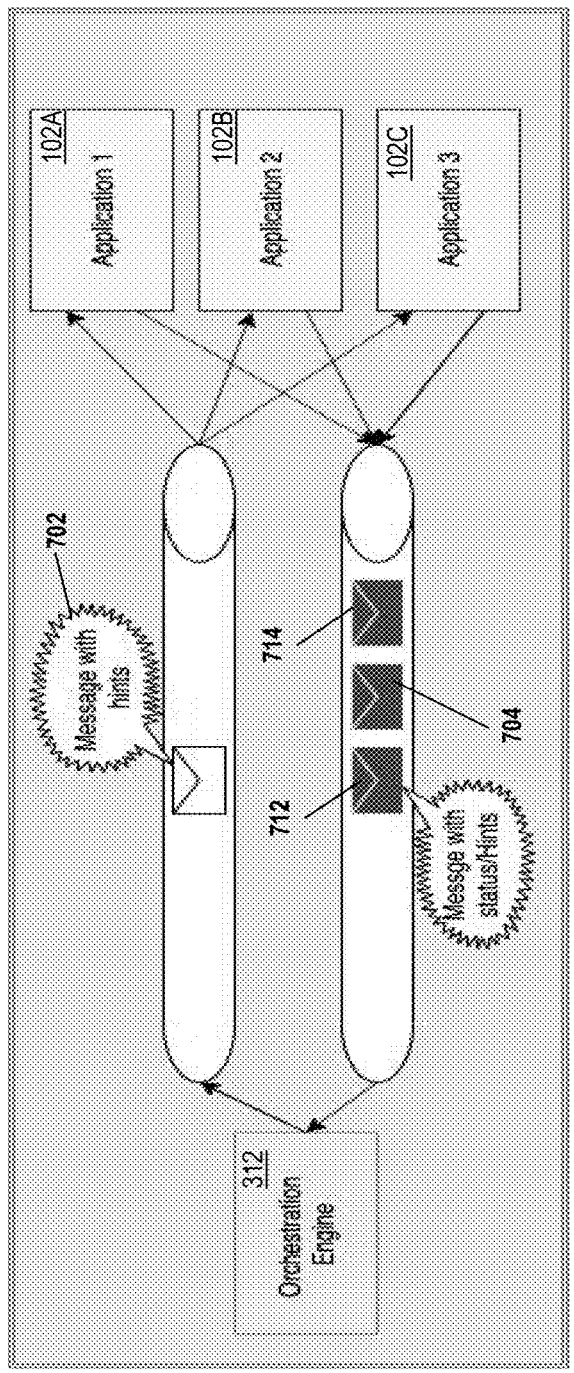

When the orchestrator 312 receives message 604, the orchestrator 312 may create another message 702 depicted at FIG. 7. The orchestrator 312 publishes message 702 to applications 102A-C. This message 702 may include the job request ID, an identifier for the application 102B, and an identifier for the entity 112B. When the second application 102B receives the message 702, the second application 102B identifies, based on the message 702, the structure of related entities 110B including entity 112B. During the identification stage, the second application identifies that there is one entity 114B that depends on entity 114C owned by another application 102C. The second application may persist the identified structure 110B and the dependency on the entity 114C, and respond to the orchestrator with a message 704 including (1) the identifier (e.g., the job request ID), (2) an indication that the identification of entities is completed, and (3) an indication, such as a hint, that the third application 110C is the owner of entity 114C at the third application 102C. At FIG. 7, the first application may again respond at 712 with an indication that the identification is completed, while the third application 102C may respond at 714 with an ignore.

Figure 8:
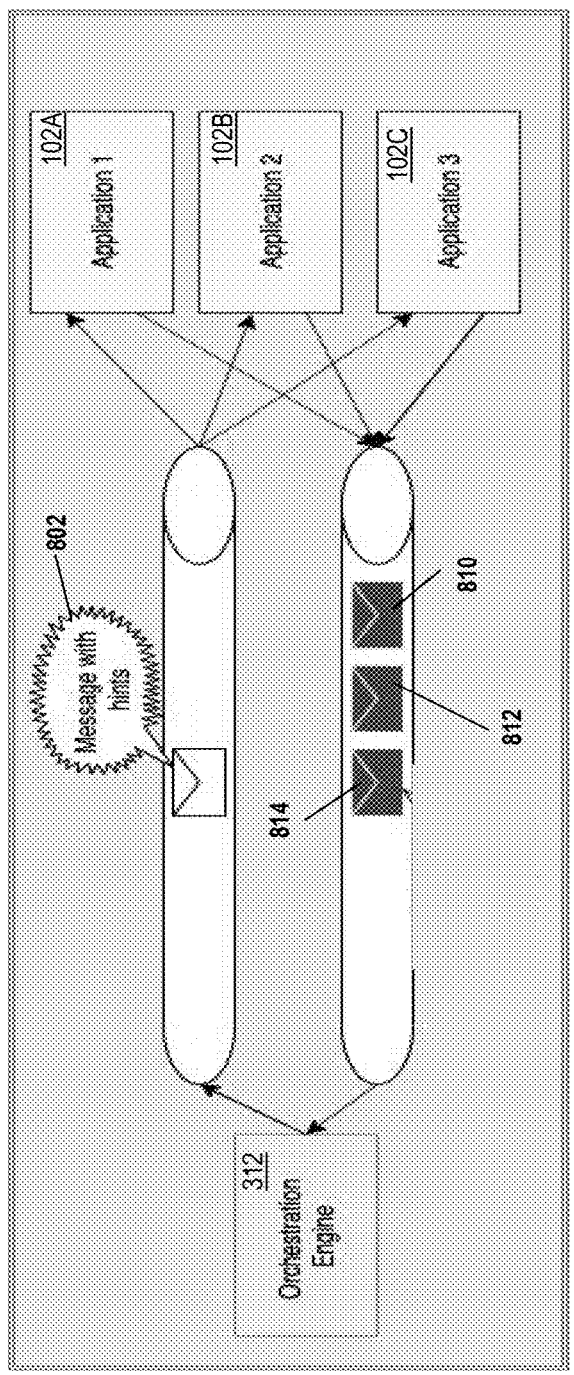

In response to receiving message 704, the orchestrator 312 may create another message 802 depicted at FIG. 8. The orchestrator 312 publishes message 802 to applications 102A-C. This message 802 may include the job request ID, an identifier for the application 102C, and an identifier for the entity 114C. When the third application 102C receives the message 802, the third application 102C identifies, based on the message 802, the structure of entities 110C related to entity 114C. The third application may persist the identified structure 110C, and respond to the orchestrator with a message 810 including the job request ID and an indication that the identification is completed. As there are no other dependencies at other applications, the message 810 does not include the identity of another application (e.g., as a hint) and dependent entity (e.g., a dependent data entity) as in messages 604 and 704. The first and second applications may again respond at 812 and 814 with an indication that the identification is completed.

Figure 9:
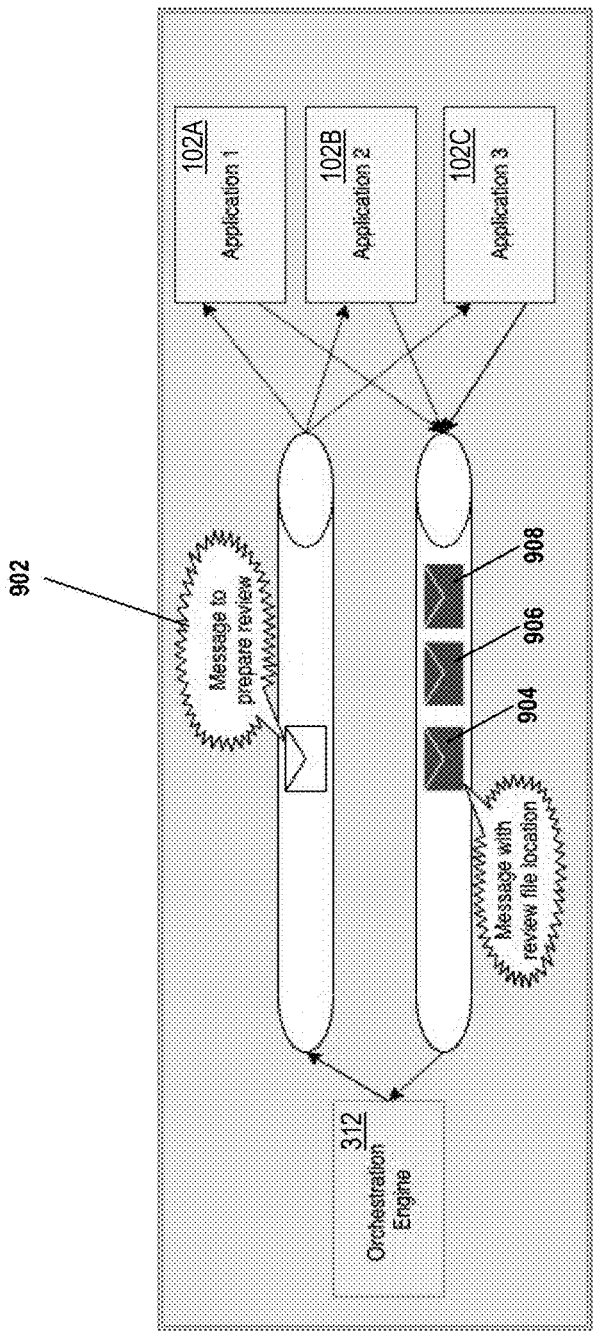

Referring again to FIG. 4, when all of the applications 102A-C associated with the job deletion respond (e.g., as in FIG. 8 at 810-814) with an identification completed, the orchestrator 312 may, at 406, proceed to a review stage. At this review stage, the orchestrator 312 may publish a message 902 (see FIG. 9) to the applications 102A-C. This message 902 may include a job request ID and a request that each of the applications 102A-C respond at 904, 906, 908 with a review file including the entity structure 110A-C or a location (e.g., an URL, etc.) of that review file.

At 408, the review files returned from the applications 102A-C may be processed for review. In some implementations, the review files are processed into a directed graph, such as the structure shown at 110A-C and then caused to be displayed at a client device, such as client device 306A (e.g., caused to be displayed by providing information to the client device so the client device can display).

At 410, the orchestrator 312 may receive an indication that the entities provided in the review file, such as entities depicted at 110A-C, may be purged (e.g., deleted). For example, the client device 306A may present the review files as a directed graph structure on a user interface at the client device 306A. This user interface may also include a user interface element at which the user can select "approved for deletion," for example. In some implementations, the user interface may include a soft delete user interface element or a hard delete user interface element.

Figure 10:
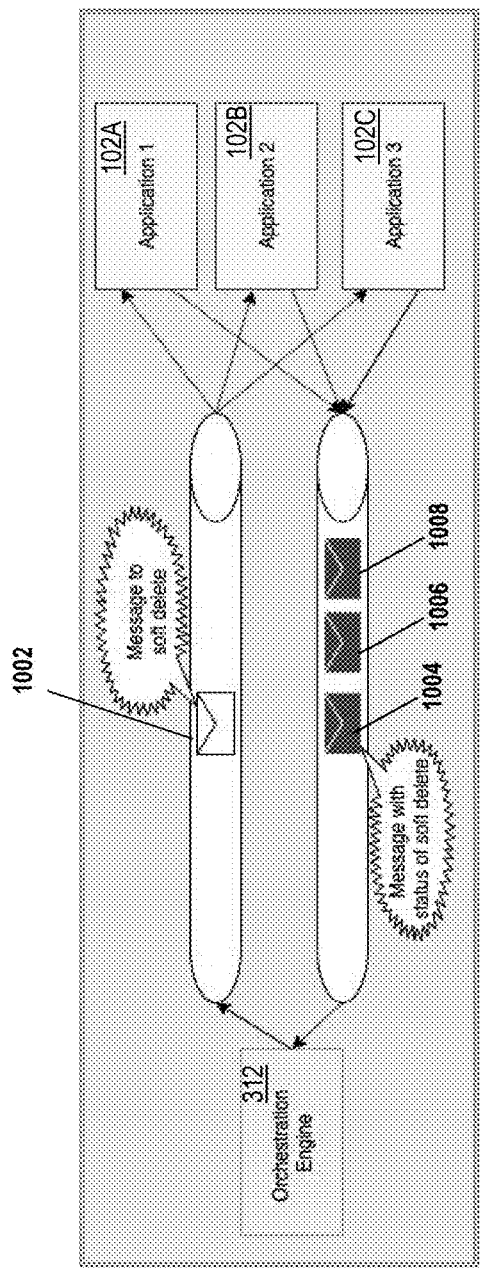

If the orchestrator 312 receives an indication that the soft delete user interface element was selected, the orchestrator 312 may, at 412, publish a message to the applications 102A-C to soft delete the entities 110A-C, for example. FIG. 10 depicts an example a message sent to applications 102A-C. This message 1002 includes the job request ID and an indication to soft delete the entities 110A-C, for example. In a soft delete, each of the applications 102A-C marks the data of entities 110A-C as inactive for applications 102A-C. In other words, the soft delete the entities 110A-C results in the data still being stored but applications 102A-C cannot access the data, so from the perspective of applications 102A-C the entities 110A-C may seem to be in a deleted state. In the example of FIG. 10, the applications 102A-C respond with acknowledgement messages 1004-1008. These acknowledgments may include the job request ID and an indication that the soft delete is active for the entities 110A-C, for example.

In some implementations, the orchestrator may roll back (or cancel) the soft delete and return the soft deleted entities 110A-C back into service so that they can be accessed by the applications 102A-C.

In some implementations, the soft delete is for a configured time duration. For example, the duration of the soft delete may be configured by the client device for 180 days (although other times may be configured as well). Alternatively, or additionally, the duration may be set by a default value configured at the orchestrator 312. In either case, at the expiration of the duration of the soft delete at 414 (so call "grace period"), the orchestrator 312 may transition to a hard delete, at 416, of the entities.

Figure 11:
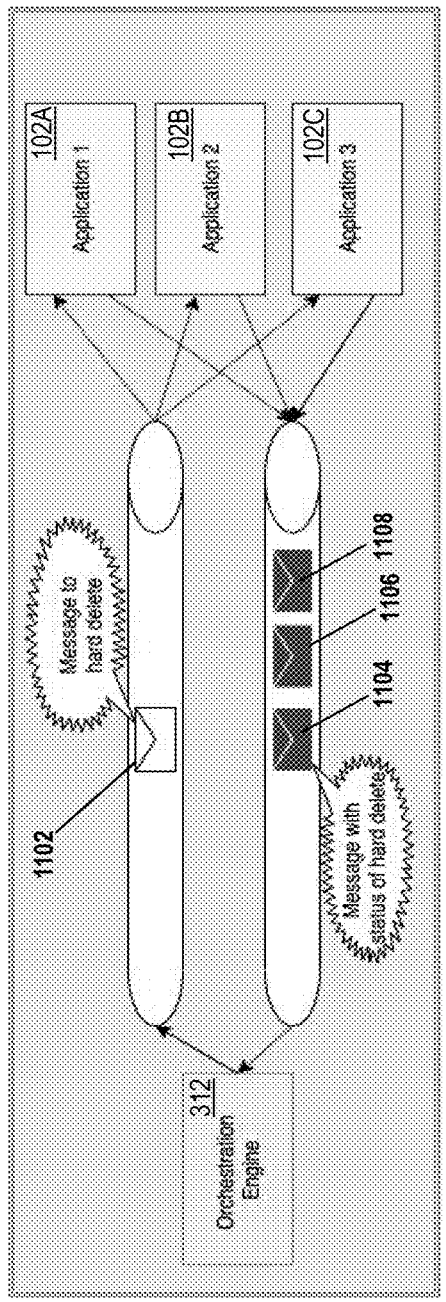

In the case of the hard delete, the orchestrator 312 may publish a message to the applications 102A-C to hard delete the entities 110A-C, for example. FIG. 11 depicts an example a message 1102 sent to applications 102A-C. This message 1102 includes the job request ID and an indication to hard delete the entities 110A-C, for example. In a hard delete, each of the applications 102A-C deletes (e.g., remove, delete, purge, etc.) the data of entities 110A-C, which may trigger message(s) to be sent to the database management systems 314A-B to delete the underlying data. In the example of FIG. 11, the applications 102A-C respond with acknowledgement messages 1104-1008, so from the perspective of the orchestrator the deletion request is complete at 420. These acknowledgments may include the job request ID and an indication that the hard delete is complete for the entities 110A-C, for example. At 420, the orchestrator may respond to the requested of the deletion (e.g., client device 306A) that the deletion is complete by sending a message to the client device, for example.

Although the example of FIG. 4 depicts a hard delete occurring after a soft delete, the orchestrator 312 may skip the soft delete and proceed directly to a hard delete. For example, if the orchestrator receives an indication that the hard delete user interface element was selected at client device 306A during 410, the orchestrator 312 may, at 416, proceed to the hard delete phase.

If the orchestrator 312 receives a failure message from any of the downstream applications 102A-C, the orchestrator may stop or cancel the deletion job. If the deletion is canceled, the orchestrator 312 may publish a message to the applications 102A-C indicating that the delete job request is canceled. The failure message may be an error message that is received from subscribing systems.

Table 1 depicts an example of a request message, such as message 602 for example, sent to downstream application, such as applications 102A-C.

TABLE 1

Request Message

```
{
    "jobId": "1234-5678",
    "messageType": "Identify",
    "realm": "xyxzy",
    "conversationStage": 2,
    "jobDetail": {
        "primaryDocumentType": "Requisition",
        "odataPurgeCriteria": "test criteria",
        "dateField": "10-Aug-2013",
        "minimumNumDays": 500,
        "includeInactive": false
    },
    "baselineStage": null,
    "hints": [
        {
            "conversationStage": 1,
            "type": "INCLUDE",
            "from": "Forms",
            "to": "Buyer",
            "fileLocation": {
                "path": "purge-dev", "uri": null,"fileName": "xyz/zyxfrx"}
        }],
    "trail": [
        {
            "conversationStage": 1,
            "component": "Buyer",
            "status": "IDENTIFICATION_COMPLETE",
            "fileLocation": {
                "path": "purge-dev", "uri": null,"fileName": "xyz/zyxfrx"}
        }]
}
```

The messages sent by the orchestrator to the applications may include, as noted, one or more of the elements shown at Table 1. For example, the message may include a job ID which is a unique identifier for the deletion job; a message type indicating the type of action requested of the application; a realm which is an identity of the client that the deletion job request belongs to; a conversation stage which is a conversation identifier that the message belongs to; job details (e.g., document or entity type, one or more deletion criterion including a date field(s); minimum number of days/grace period or duration for the soft delete, etc.); whether inactive entities should be included in the deletion; a base line stage (e.g., a base line stage indicates the conversation stage when the primary system did responded with identification completes message); and one or more hints. Table 2 provides a summary of the elements of Table 1.

TABLE 2

| Field | Comments |
| --- | --- |
| jobId | A unique identifier for any job created. |
| messageType | Action the message generated for. |
| realm | Client that the purge job request belongs. |
| conversationStage | Conversation identifier that message belongs to. Each response tied back to request using jobid and conversation stage. |
| jobDetail: primaryDocumentType | The primary document type that would form the root of tree for start of the identification during the purging process. |
| jobDetail : odataPurgeCriteria | The criteria that would be applied on the primary document type for identification. |

TABLE 2-continued

| Field | Comments |
| --- | --- |
| jobDetail.: dateField | Date field is a field that is part of the primary document type. |
| jobDetail: minimumNumDays | A criteria created based on above date field with date less than currentdate-minimumNumDays. |
| jobDetail: includeInactive | Whether documents flagged as inactive should be considered for deletion |
| baselineStage | Base line stage indicates the conversation stage when the primary system did responded with identification completes message |
| Hints[0]: conversationStage | Conversation stage when the hint got generated by the subscribing application. |
| Hints[0]: type | Type of the hint "Inclusion" or "Exclusion." |
| Hints[0]: from | The source system of the hint. |
| Hints[0]: to | The target system of the hint. |
| Hints[0]: fileLocation: path | A location of the file that contains the details about the hints that are generated, this is location that all the applications would be able to access. |
| Hints[0]: fileLocation: uri | |
| Hints[0]: fileLocation: fileName | |
| Trail[0]: conversationStage | This is the trail for every response that is received by the orchestrator from the various subscribing application. |
| Trail[0]: component | |
| Trail[0]: status | |
| Trail[0]: fileLocation: path | The trail would contain details for all the responses received across all applications. |
| Trail[0]: fileLocation: uri | |
| Trail[0]: fileLocation: fileName | |

Table 3 depicts an example of a response message sent by an application to the orchestrator (e.g., response message 604).

TABLE 3

Response Message:

```
{
  "jobId": "1234-5678",
  "realm": "xyxzy",
  "publisher": "Buyer",
  "messageType": "Identify",
  "conversationStage": 1,
  "jobDetail": {
    "primaryDocumentCount": 500,
    "documentCount": 100,
    "status": "IDENTIFICATION_COMPLETE",
    "errorMessage": null
  },
  "fileLocation": {
    "path": "purge-dev", "uri": null, "fileName": "xyxsxys/xy-exe"
  },
  "baseLine": true,
  "hints": [
    {
      "type": "INCLUDE", "to": "Forms"
    }]
}
```

The response message may include one or more of the elements shown at Table 4 below.

TABLE 4

| Field | Comments |
| --- | --- |
| jobId | A unique identifier for a job that is created. The response contains the same jobId that it received in the request message. |
| realm | The client that the purge job request belongs to. |

TABLE 4-continued

| Field | Comments |
| --- | --- |
| publisher | The component that is publishing the message. |
| messageType | The message type is the same as the request message being responded to. |
| conversationStage | The conversationstage has the same values as the request that current message is responding to. |
| jobDetail: primaryDocumentCount | The number of primary documents that were identified for the request. |
| jobDetail: documentCount | The total documents that were identified for the request. |
| jobDetail: status | The response status that depicts the success of failure for the given request. Each success has different status as per the workflow state. |
| jobDetail: errorMessage | The error message in case error has occurred and needs to be communicated back to client. |
| fileLocation: path | The location of the file that contains the details about the hints that are generated for the review file. |
| fileLocation: uri | |
| fileLocation: fileName | |
| baseLine | This may be either "true" or "false", and is used to determine the base line stage. It is true only when primary document owner does identification evaluation based on primary document type |
| hints[0]: type | This indicates the type of hint as "Include" or "Exclude". |
| hints[0]: to | The target application for the hint. |

Figure 12:
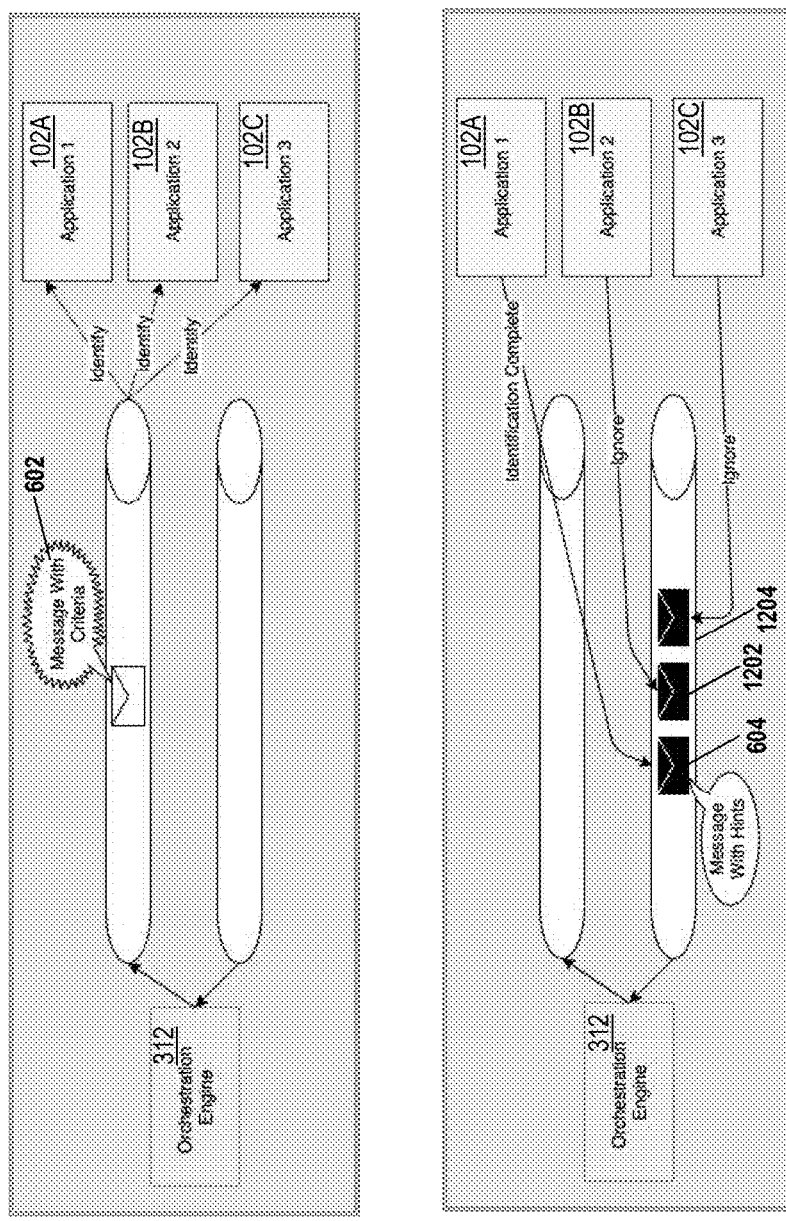

FIG. 12 depicts an implementation of the publication message 602 and the responses 604, 1202, and 1204. FIG. 12 is similar to FIG. 6 in some respects but shows additional details for the responses. Referring to FIG. 12, the orchestration engine 312 may publish a message 602 including a purge request including a "messageType" type as "Identify" that is received by each of the downstream application 102A-C. The downstream applications 102A-C may each parse the request but only one application 102A may be the primary owner of the primary criteria document that can initiate the identification process. At this stage, the downstream applications 102B-C may respond, 1202 and 1204, to message 602 with the job id, conversation stage, and the "jobDetail: status" as "Ignored", while application 102A responds at 604 with the job id, conversation ID, and an indication that the identification of entities is complete. The first application 102A may include in response 604 a so-called hint "to application 2" where the entity 112B is owned. Although the first application is aware of the second application, the first application does not directly communicate with the second application but instead communicates with the orchestrator. This may keep the intercommunication between systems controlled instead of complex web of communication channel between systems.

Figure 13:
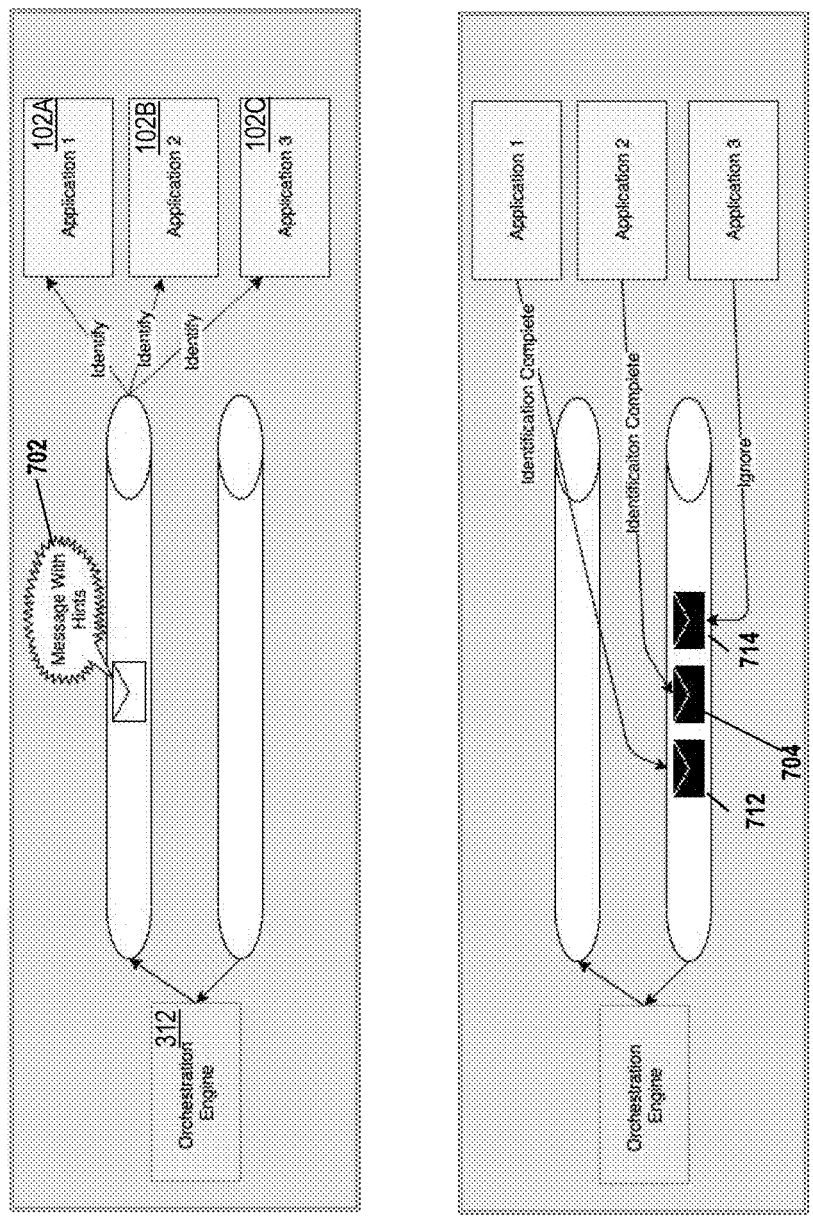

When the orchestrator 312 receives 604, 1202, and 1204, the orchestrator may publish a message 702 to the applications 102A-C as shown at FIG. 13. FIG. 13 is similar to FIG. 7 in some respects but shows additional details for the responses. The orchestrator may message 702 with the same job id but it may increment the conversation stage. The message 702 may include "messageType" type as "Identify." Each of the applications 102A-B responds. The first application 102A may respond with "Identification Complete" as it has already identified its entities 110A, and the second application 102B may respond with "Identification complete" (and include a hint indicating the third application). The third application may continue to respond with an ignore. As noted above, this identification process may continue until all the involved applications respond with "Identification Complete" with no outstanding hints.

There is an alternate workflow in case a "hints [0]: type: EXCLUDE" gets generated by an application to the original application. In such a case, there is a hint that an application generates for original owning application. The exclusion hint would result in recalculation and exclusion of identified objects by the primary owning application. A message with "baseLine" attribute as "true" may be generated by the owning application to indicate a new baselining of the identification so other applications would need to ignore earlier identifications and restart the identifications. Each message that is published by the orchestrator may have a baseline stage. The baseline stage is the conversation stage originated by the primary or owner application, such as application 102A. Since the other identification is driven by the primary application identification, changes in the primary documents identified should result in a recalculation of the other identification by other applications. As such, whenever the baseline stage changes, the applications need to discard their current state of identification and restart the identification process.

In some implementations, the orchestrator 312 may control the number of purge job that can be executed concurrently. For example, the orchestrator 312 may allow only one delete job per tenant since the same entity identified in two different deletion jobs might cause confusion. In some implementations, the orchestrator 312 may also allow one central location for all the purge related data to be available. The orchestrator 312 would be used to obtain all data regarding a purge job in terms of systems involved and all the data identified for purge across various systems. In some implementations, the orchestrator 312 may serve as central location to obtain all the audit actions that has occurred with respect to purge job.

Figure 14:
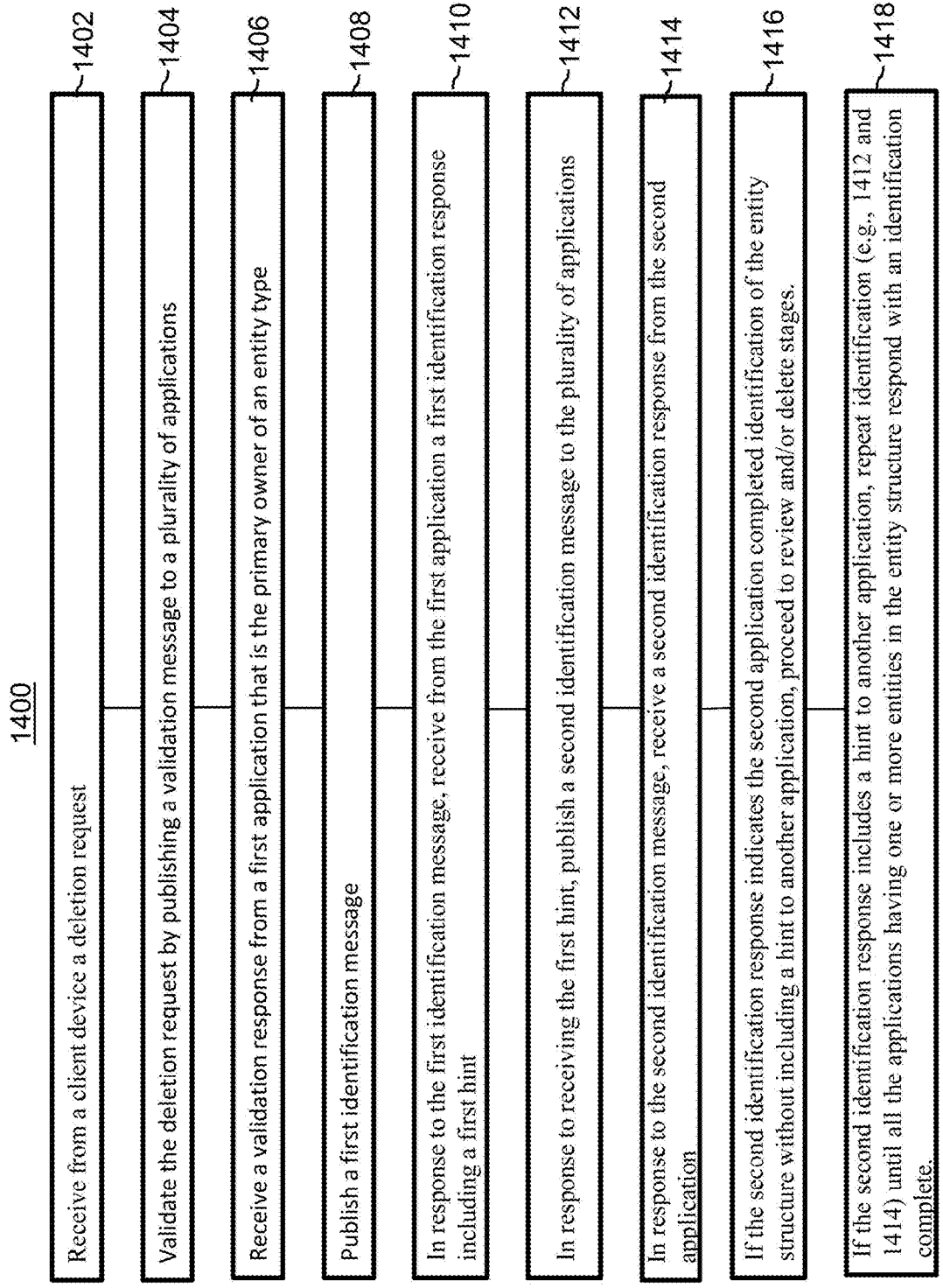
FIG. 14 is an example of a process, in accordance with some implementations of the current subject matter.

FIG. 14 depicts an example process 1400 for orchestrator directed deletions, in accordance with some embodiments.

At 1402, the orchestrator 312 receives a deletion request from a client device (or an application associated with that client device such as client device 306). The deletion request may be in the form of a query and may include an entity type (e.g., "requisition documents") and the at least one criterion (e.g., "created on or before Aug. 1, 2006"). When the orchestrator 312 receives the deletion request, the orchestrator may create a job request to track the workflow progress of the client's deletion request.

To validate the deletion request, the orchestrator 312 publishes, at 1404, a validation message to a plurality of applications including a first application and a second application, such as application 102A-C. The validation message including an entity type and at least one criterion. This validation message enables the primary owner of the entity type to respond. For example, if application 102A is the primary owner of "requisition documents" it responds to the validation message with a validation response message.

At 1406, the orchestrator 312 receives a validation response from the first application, such as 102A. The validation response message may include an indication that the first application is a primary owner of the entity type.

At 1408, the orchestrator 312 publishes a first identification message to the plurality of applications. The first identification message may indicate to the plurality of applications to identify an entity structure for the entity type of the deletion request. For example, the first identification message may be published to the first and second applications 102A-B including a job ID, the entity type, the at least one criterion, and/or a request to identify the entity structure for the entity type. The first identification message may be the same or similar to message 602 described above.

In response to the first identification message, the orchestrator 312 receives, at 1410, a first identification response from the first application. The first identification response may include an indication that an identification completed at the first application for the entity structure, and may also include an indication of a first hint regarding a first dependent data entity of the entity structure that is owned by the second application. The first identification response may be the same or similar to message 604 noted above.

In response to receiving the first hint, the orchestrator 312 publishes, at 1412, a second identification message to the plurality of applications. The second identification message may include the entity type, the at least one criterion, a request to identify an entity structure for the entity type, and/or a second hint for the second application. The second hint may indicate the first dependent entity of the entity structure that is owned by the second application. The second identification response may be the same or similar to message 702 noted above.

At 1414, the orchestrator 312 receives a second identification response from the second application. If the second identification response indicates the second application completed identification of the entity structure without including a hint to another application, the entity structure identification is complete. If however second identification response includes a hint to another application, the orchestrator repeats the process at 1412 and 1414 until all the applications having one or more entities in the entity structure respond with an identification complete.

In response to receiving identification complete from the plurality of applications including the first and second applications, the orchestrator 312 proceeds to a review stage at 1416. During the review stage, the orchestrator 312 may publish a message to the plurality of applications including the first and second applications to respond with a review file including the entity structure or a location (e.g., an URL, etc.) of that review file. This publication message may be the same or similar to message 902 at FIG. 9.

In response to receiving from the plurality of applications the review files depicting the entity structure, the orchestrator 312 may request the plurality of applications to delete, at 1418, the entities of the entity structure. The deletion may be a soft delete or a hard delete based on, for example, a selection via a user interface or a default setting. After the plurality of applications confirms the deletion, the orchestrator 312 may respond to the client device (which requested the deletion job) with a confirmation that the deletion of the entity structure is complete.

FIG. 15 depicts another example of a system, in accordance with some implementations of the current subject matter. In some implementations, the current subject matter can be configured to be implemented in a system 1500, as shown in FIG. 15. The system 1500 can include a processor 1510, a memory 1520, a storage device 1530, and an input/output device 1540. Each of the components 1510, 1520, 1530, and 1540 can be interconnected using a system bus 1550. The processor 1510 can be configured to process instructions for execution within the system 1500. In some implementations, the processor 1510 can be a single-threaded processor. In alternate implementations, the processor 1510 can be a multi-threaded processor and/or a graphics processor unit. The processor 1510 can be further configured to process instructions stored in the memory 1520 or on the storage device 1530, including receiving or sending information through the input/output device 1540. The memory 1520 can store information within the system 1500. In some implementations, the memory 1520 can be a computer-readable medium. In alternate implementations, the memory 1520 can be a volatile memory unit. In yet some implementations, the memory 15120 can be a non-volatile memory unit. The storage device 1530 can be capable of providing mass storage for the system 1500. In some implementations, the storage device 1530 can be a computer-readable medium. In alternate implementations, the storage device 1530 can be a floppy disk device, a hard disk device, an optical disk device, a tape device, non-volatile solid-state memory, or any other type of storage device. The input/output device 1540 can be configured to provide input/output operations for the system 1500. In some implementations, the input/output device 1540 can include a keyboard and/or pointing device. In alternate implementations, the input/output device 1540 can include a display unit for displaying graphical user interfaces. For example, the orchestrator 312 may comprise or be comprised on at least one processor and at least one memory including program code which when executed provides operations disclosed herein with respect to the orchestrator. Moreover, the orchestrator 312 may be implemented as a service, such as a software-as-a-service. Alternatively, or additionally, the orchestrator 312 may be implemented on a cloud-based platform as a service. Alternatively, or additionally, the orchestrator 312 may be implemented on premises at an end-user location.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   validating, by an orchestrator, a deletion request by publishing a validation message to a plurality of applications including a first application and a second application, the validation message including an entity type and at least one criterion, the entity type associated with an entity structure of data entities;
   receiving, by the orchestrator, a validation response from the first application, the validation response message including a first indication that the first application is a primary owner of the entity type associated with the deletion request;
   publishing, by the orchestrator, a first identification message to the plurality of applications, the first identification message indicating to the plurality of applications to identify the entity structure for the entity type;
   in response to the first identification message being published, receiving, by the orchestrator, a first identification response from the first application, the first identification response including a second indication that identification is completed at the first application for the entity structure, the first identification response further including a first hint to a first dependent data entity of the entity structure that is owned by the second application;
   in response to receiving the first identification response including the first hint, publishing, by the orchestrator, a second identification message to the plurality of applications, the second identification message including a second hint;
   in response to the second identification message being published, receiving, by the orchestrator, a second identification response from the second application;
   in response to the second identification response indicating the second application completed identification of the entity structure and the second identification response not including another hint to another application, proceeding, by the orchestrator, with a review of the entity structure and/or a deletion of the entity structure; and
   in response to the second identification response including the other hint to the other application, publishing, by the orchestrator, another identification message to the plurality of applications.

2. The method of claim 1 further comprising:
   receiving, by the orchestrator, the deletion request from a client device, the deletion request including the entity type being deleted and the at least one criterion for deletion of the entity type.

3. The method of claim 1, wherein the publishing of the another identification message is repeated until the plurality of applications accessing the entity structure each respond without including another hint to another dependent data entity at another application.

4. The method of claim 1, wherein the entity type comprises a document type, wherein the entity structure includes a plurality of data entities shared among at least a portion of the plurality of applications, and wherein the plurality of data entities comprise data objects.

5. The method of claim 1, wherein the review comprises publishing to the plurality of applications including the first and second applications a review file request to provide a review file including the entity structure or a location of the review file.

6. The method of claim 5, wherein in response to receiving from the plurality of applications one or more review files including the entity structure, publishing, by the orchestrator, to the plurality of applications a deletion request for the entity structure.

7. The method of claim 5, wherein the deletion request may indicate a soft delete.

8. The method of claim 5, wherein the deletion request may indicate a hard delete.

9. A system comprising:
   at least one processor; and
   at least one memory including program code which when executed by the at least one processor configures the system to cause operations comprising:
   validating a deletion request by publishing a validation message to a plurality of applications including a first application and a second application, the validation message including an entity type and at least one criterion, the entity type associated with an entity structure of data entities;
   receiving a validation response from the first application, the validation response message including a first indication that the first application is a primary owner of the entity type associated with the deletion request;
   publishing a first identification message to the plurality of applications, the first identification message indicating to the plurality of applications to identify the entity structure for the entity type;
   in response to the first identification message being published, receiving a first identification response from the first application, the first identification response including a second indication that identification is completed indication at the first application for the entity structure, the first identification response further including a first hint to a first dependent data entity of the entity structure that is owned by the second application;
   in response to receiving the first identification response including the first hint, publishing a second identification message to the plurality of applications, the second identification message including a second hint;

response to the second identification message being published, receiving a second identification response from the second application;

in response to the second identification response indicating the second application completed identification of the entity structure and the second identification response not including another hint to another application, proceeding with a review of the entity structure and/or a deletion of the entity structure; and in response to the second identification response including the other hint to the other application, publishing another identification message to the plurality of applications.

10. The system of claim 9 further comprising:

receiving the deletion request from a client device, the deletion request including the entity type being deleted and the at least one criterion for deletion of the entity type.

11. The system of claim 9, wherein the publishing of the another identification message is repeated until the plurality of applications accessing the entity structure each respond without including another hint to another dependent data entity at another application.

12. The system of claim 9, wherein the entity type comprises a document type, wherein the entity structure includes a plurality of data entities shared among at least a portion of the plurality of applications, and wherein the plurality of data entities comprise data objects.

13. The system of claim 9, wherein the review comprises publishing to the plurality of applications including the first and second applications a review file request to provide a review file including the entity structure or a location of the review file.

14. The system of claim 13, wherein in response to receiving from the plurality of applications one or more review files including the entity structure, publishing to the plurality of applications a deletion request for the entity structure.

15. The system of claim 13, wherein the deletion request may indicate a soft delete.

16. The system of claim 13, wherein the deletion request may indicate a hard delete.

17. A non-transitory computer-readable storage medium including program code which when executed by at least one processor causes operations comprising:

validating a deletion request by publishing a validation message to a plurality of applications including a first application and a second application, the validation message including an entity type and at least one criterion, the entity type associated with an entity structure of data entities;

receiving a validation response from the first application, the validation response message including a first indication that the first application is a primary owner of the entity type associated with the deletion request;

publishing a first identification message to the plurality of applications, the first identification message indicating to the plurality of applications to identify the entity structure for the entity type;

in response to the first identification message being published, receiving a first identification response from the first application, the first identification response including a second indication that identification is completed at the first application for the entity structure, the first identification response further including a first hint to a first dependent data entity of the entity structure that is owned by the second application;

in response to receiving the first identification response including the first hint, publishing a second identification message to the plurality of applications, the second identification message including a second hint;

response to the second identification message being published, receiving a second identification response from the second application;

in response to the second identification response indicating the second application completed identification of the entity structure and the second identification response not including another hint to another application, proceeding with a review of the entity structure and/or a deletion of the entity structure; and in response to the second identification response including the other hint to the other application, publishing another identification message to the plurality of applications.

18. The non-transitory computer-readable storage medium of claim 17 further comprising:

receiving the deletion request from a client device, the deletion request including the entity type being deleted and the at least one criterion for deletion of the entity type.

19. The non-transitory computer-readable storage medium 17, wherein the publishing of the another identification message is repeated until the plurality of applications accessing the entity structure each respond without including another hint to another dependent data entity at another application.

20. The non-transitory computer-readable storage medium of claim 17, wherein the entity type comprises a document type, wherein the entity structure includes a plurality of data entities shared among at least a portion of the plurality of applications, and wherein the plurality of data entities comprise data objects.

* * * * *